H. B. EYNON.
BRUSH CONNECTION.
APPLICATION FILED NOV. 9, 1920.

1,392,563.

Patented Oct. 4, 1921.

Inventor
Howard B. Eynon.
By his Attorneys
Pennie Davis Marvin & Edmonds

UNITED STATES PATENT OFFICE.

HOWARD BLAINE EYNON, OF WELLSVILLE, NEW YORK.

BRUSH CONNECTION.

1,392,563.  Specification of Letters Patent.  Patented Oct. 4, 1921.

Application filed November 9, 1920. Serial No. 422,768.

*To all whom it may concern:*

Be it known that I, HOWARD B. EYNON, a citizen of the United States, residing at Wellsville, in the county of Allegheny, State of New York, have invented certain new and useful Improvements in Brush Connections; and I do hereby declare the following to be a full, clear, and exact description of the invention, such as will enable others skilled in the art to which it pertains to make and use the same.

My invention is an improvement in methods of securing cable ends to brushes, in what is known as a pig tail connection, and consists in forming in the brush an opening of slightly greater diameter than the cable for receiving the cable end and in filling the space about the cable with angular pieces of metal of a slightly greater length than the distance between the cable and the wall of the opening.

In the drawings:—

The improved method consists in forming in the brush indicated at 1 an opening 2 of greater diameter than the cable 3 whose end is to be connected to the brush; the opening is preferably of greater depth than the length of that portion of the end which is to be inserted in the opening. Thus an annular space 4 is provided between the cable end and the wall of the opening. Within this space I force short pieces of fine wire indicated at 5, each of the said pieces being bent upon itself and tangled with its fellows to form a great number of fine projecting ends to engage the carbon and the cable and secure them to one another. In the main, the pieces of wire are U-shaped or V-shaped, the ends, however, diverging at an acute angle.

Preferably the pieces of wire are of a length slightly greater than the diameter of the annular space 4, that is, they are of slightly greater length than the distance between the periphery of the cable end and the wall of the opening 2. The space beneath the end of the cable and between the cable end and the wall of the opening is completely filled with these pieces of wire as clearly shown in Fig. 1. When so connected the cable end is firmly held in place in the brush, the pieces of wire resisting the dislodgement of the cable end by biting into the end and into the wall of the opening with their cutting ends.

The pressure used in forcing the cut wire into the opening varies with the size of the brush and in accordance with the experience of the operator. The cut wire may be forced into the opening between the cable end and the wall thereof by hand or in any other desired manner.

Figure 1:
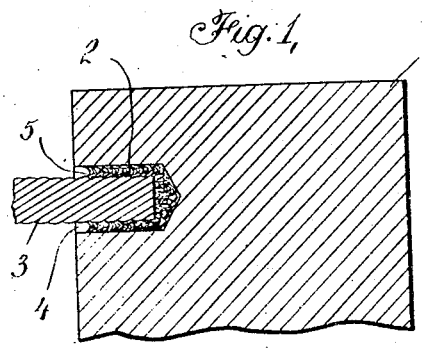
Figure 1 is a sectional view showing one method of securing the cable ends in place.
Figure 2:
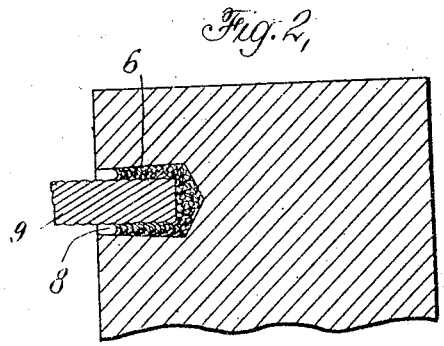
Fig. 2 is a similar view showing another arrangement.

If desired the opening 6 of the brush 7 may be undercut as shown in Fig. 2. In this arrangement the cut wire 8 fills the space between the cable end 9 and the opening wall in the same manner as shown in Fig. 1.

Figure 6:
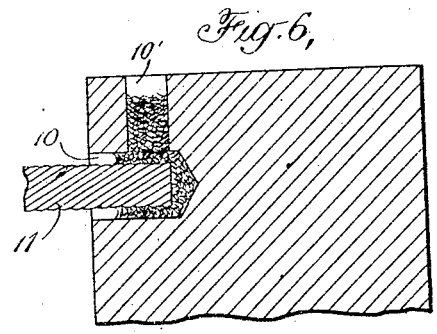
Fig. 6 is a view similar to Figs. 1 and 2 showing another arrangement.

Or, the opening 10 for the cable end 11 may have a lateral extension 10', as shown in Fig. 6 for facilitating the insertion of the cut wire, but in either case, the action is the same, the pieces of wire resisting withdrawal of the cable end by biting into the opening wall and the cable end with their cut ends.

Figure 4:
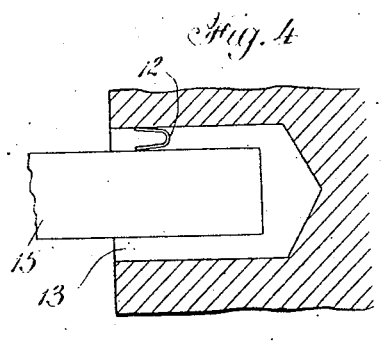
Figs. 4 and 5 are diagrammatic views showing the theoretical action of the holding means.

It is desirable that the pieces of wire be of a length greater than the diameter of the annular space between the cable end and the opening wall but it is also desirable that they be not much greater in length. If the pieces are cut too long, the said pieces will take the position shown in Fig. 4 when pushed into place. As shown in this figure the pieces of wire 12 are in length four or five times the width of the space 13 between the wall of the opening in the brush 14 and the cable end 15. When pieces of this length are forced into place the ends of the wire are practically parallel and they do not hold well, the biting action of the cut ends being prevented by the parallel position of the ends.

Figure 5:
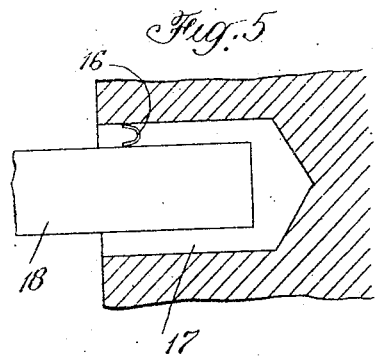

If the wires are cut too short there is no holding action, but if they are cut of the length shown in Fig. 5 wherein the pieces 16 have a length from one and a half to two times the diameter of the annular space 17 between the wall of the opening and the cable end 18 they will hold firmly, the ends standing at such an angle that they will bite into the wall of the opening and into the cable end.

If the wire is cut in lengths less than the diameter of the annular space they will sift out of the opening even if considerable pressure is used in tamping. Preferably copper cable .005 of an inch in diameter is used though it is obvious that other sizes may be used and other character of wire.

Figure 3:
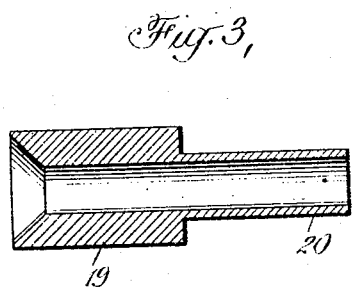
Fig. 3 is a sectional view of the tamping die.

In Fig. 3 there is shown a die for facilitating the proper placing of the cable end in the opening. This die, as shown is a tubular body 19 having a reduced portion 20, which will fit within the opening of the brush around the cable end. The bore of the die is of a size to receive the cable end, and the cable end is inserted by placing it in the die after which the portion 20 of the die is inserted in the opening of the brush with the cable end in place.

In the construction of Fig. 6 the die may be partially withdrawn beyond the lateral extension 12 and the bottom part of the opening may be filled. Afterward the die is entirely withdrawn and the remaining space is filled with the cut wire.

I claim:—

1. A method of securing a flexible conductor to a brush which consists in forming in the brush an opening, inserting the conductor, filling the remainder of the opening between the conductor and the wall of the opening with pointed pieces of metal and pressing the same into place.

2. A method of securing a flexible conductor to a brush which consists in forming in the brush an opening, inserting the conductor and forcing into the space between the conductor and the wall of the opening pieces of wire bent into angular form.

3. A method of securing a flexible conductor within an opening formed in a brush, and into which the conductor is inserted, which comprises pressing into the space between the conductor and the wall of the opening pieces of wire for engaging the conductor and the wall and of greater length than the distance to be spanned between the conductor and the wall of the opening.

4. A carbon brush having an opening and a flexible conductor received in the opening, and a packing of substantially V-shaped pieces of wire between the conductor and the wall of the opening.

5. A carbon brush having an opening and a flexible conductor received in the opening and a packing of angular pieces of metal between the conductor and wall of the opening.

6. A carbon brush having an opening, and a flexible conductor received in the opening and an independent packing of pointed pieces of metal in the opening about the conductor for engaging the conductor and the wall of the opening.

7. A bonding material for securing flexible conductors in brush openings, consisting of angular pieces of metal.

8. A method of securing a conductor to a brush, which consists in forming in the brush an opening, inserting the conductor in the opening, and filling the space between the conductor and the wall of the opening with pieces of metal having points for engaging the wall of the opening and the conductor and for intertangling with each other to form a bond between the brush and the conductor.

In testimony whereof I affix my signature.

HOWARD BLAINE EYNON.